United States Patent
Choi

(10) Patent No.: US 10,923,927 B2
(45) Date of Patent: Feb. 16, 2021

(54) WEARABLE CHARGING DEVICE FOR SMARTWATCH

(71) Applicant: MARK & DRAW Co., Ltd, Seoul (KR)

(72) Inventor: Teakjin Choi, Namyangju-si (KR)

(73) Assignee: MARK & DRAW CO., LTD, Seoul (KR)

( * ) Notice: Subject to any disclaimer, the term of this patent is extended or adjusted under 35 U.S.C. 154(b) by 69 days.

(21) Appl. No.: 16/394,211

(22) Filed: Apr. 25, 2019

(65) Prior Publication Data

US 2020/0343745 A1  Oct. 29, 2020

(51) Int. Cl.
    *H02J 7/00*     (2006.01)
    *H02J 7/02*     (2016.01)
    *H02J 50/12*    (2016.01)

(52) U.S. Cl.
    CPC .......... *H02J 7/0044* (2013.01); *H02J 7/0027* (2013.01); *H02J 7/025* (2013.01); *H02J 50/12* (2016.02)

(58) Field of Classification Search
    CPC ........ H02J 7/0044; H02J 50/12; H02J 7/0027; H02J 7/025; H02J 17/00; H02J 5/005
    See application file for complete search history.

(56) References Cited

U.S. PATENT DOCUMENTS

| | | | |
|---|---|---|---|
| 6,213,634 B1 * | 4/2001 | Harrington | A44C 5/0053 224/170 |
| 2014/0253394 A1 * | 9/2014 | Nissinen | H01Q 7/00 343/702 |
| 2015/0280483 A1 * | 10/2015 | Golko | H02J 50/90 320/108 |
| 2016/0357324 A1 * | 12/2016 | Smith | G06F 3/04817 |
| 2018/0203482 A1 * | 7/2018 | Nazzaro | H02J 5/005 |

FOREIGN PATENT DOCUMENTS

| | | |
|---|---|---|
| KR | 10-1502766 B1 | 3/2015 |
| KR | 10-1548465 B1 | 8/2015 |
| KR | 10-1655922 B1 | 9/2016 |

* cited by examiner

*Primary Examiner* — Carlos Amaya
(74) *Attorney, Agent, or Firm* — Paratas Law Group, PLLC

(57) ABSTRACT

Disclosed is a wearable charging device for a smartwatch, including: a cradle including an accommodation groove in which a main body of a smartwatch is accommodated; and a wireless charging module mounted in the cradle to be attached to or detached from the cradle by an attachment-detachment unit and configured to generate an electromagnetic field to charge a battery embedded in the main body of the smartwatch.

14 Claims, 10 Drawing Sheets

WEARABLE CHARGING DEVICE FOR SMARTWATCH

BACKGROUND

The present invention relates to a charging device for a smartwatch, and more specifically, to a wearable charging device for a smartwatch which allows a smartwatch that performs mobile communication to be charged while the smartwatch is worn on a user's wrist.

A smartwatch is a watch-type mobile communication terminal that is worn on a user's wrist and has been developed as a comprehensive multimedia communication device that performs various functions such as a voice and video call function, an information input and output function, and a wireless data transceiving function, a photo or video taking function, a music or movie file playing function, a game function, a broadcast receiving function, and the like.

The smartwatch receives power from a battery for performing the various functions. Since a main body of the smartwatch should be worn on a user's wrist, a size of a power supply battery applied to the smartwatch is limited, and thus the battery should be embedded in the main body. Therefore, the capacity of the battery embedded in the smartwatch is limited, and inconvenience is caused due to the battery frequently needing to be charged.

That is, a battery can be replaced by being attached to or detached from a general mobile communication terminal, but since the smartwatch is worn on a wrist, the battery should be embedded in the smartwatch, and the charging capacity of the battery is also limited. Therefore, when the smartwatch is used for a long time, the embedded battery should be frequently charged, and the smartwatch should be removed from a user's wrist whenever the embedded battery is charged.

Korean Registered Patent No. 10-1655922 discloses a smartwatch which is supplied with power from a removable battery mounted in a band, wherein the band is worn on a user's wrist and provided with a battery groove and a battery cover that allow the removable battery to be mounted in or removed from the band.

However, since a main body of the smartwatch applied with the removable battery should even be electrically connected with the band, the smartwatch has a complicated structure and is difficult to manufacture, and thus the smartwatch has not been commercialized.

Further, various charging modules that enable a smartphone battery to be easily charged by being simply mounted in or removed from a smartphone are suggested.

However, in most of the conventional charging modules for a smartwatch, a charging module is mounted in a main body of a smartwatch for use (for example, Korean Registered Patent No. 10-1655922). When the charging module hits another object during the activity of a user, the charging module is separated from the main body of the smartwatch, and thus there is a risk of damage or loss.

(Patent Document)

Korean Registered Patent No. 10-1655922 (Registered on Sep. 2, 2016)

Korean Registered Patent No. 10-1502766 (Registered on Mar. 10, 2015)

Korean Registered Patent No. 10-1548465 (Registered on Aug. 24, 2015)

SUMMARY

The present invention is directed to providing a wearable charging device for a smartwatch which allows a smartwatch to be easily attached or detached, allows a smartwatch battery to be efficiently charged, and can prevent unintended separation due to a collision with another object.

In addition, the present invention is directed to providing a wearable charging device for a smartwatch which allows a charging module to be easily attached to or detached from a cradle in which the smartwatch is mounted, and thus the charging module can be easily replaced and used.

According to an aspect of the present invention, there is provided a wearable charging device for a smartwatch including a cradle including an accommodation groove in which a main body of a smartwatch is accommodated, and the device includes a wireless charging module mounted in the cradle to be attached to or detached from the cradle by an attachment-detachment unit and configured to generate an electromagnetic field to charge a battery embedded in the main body of the smartwatch.

The cradle may include a watch holder formed so that the accommodation groove is open downward and a module holder formed on one portion of the watch holder to extend in a lateral direction.

The wireless charging module may include a charging part, which includes a coil mount unit and a power supply unit, and a cover configured to cover a lower portion of the charging part to shield the charging part, wherein the coil mount unit is disposed on a lower portion of the accommodation groove of the watch holder and around which a first coil for generating an electromagnetic field is wound, and the power supply unit includes a battery cell and a printed circuit board embedded therein, wherein the battery cell is accommodated in the module holder and applies a current to the first coil, and the printed circuit board controls the current to be supplied from the battery cell to the first coil.

The attachment-detachment unit may include a coupling groove, a front end-coupling protrusion, and a rear end-coupling protrusion, wherein the coupling groove is formed on one end portion of an open edge portion on a lower portion of the accommodation groove, the front end-coupling protrusion is formed on one end portion of the wireless charging module to protrude and is inserted in the coupling groove to be caught, and the rear-end coupling protrusion is formed on the other end portion of the wireless charging module to protrude, is insertion-coupled into the coupling hole that is formed on the one end portion of the module holder unit to pass therethrough, and is pushed by pressure applied from the outside to escape from the coupling hole.

The front end-coupling protrusion may have a front end portion in an upwardly pointing hook shape, and the coupling groove may have a groove shape corresponding to the front end-coupling protrusion.

A speaker hole may be formed in an edge portion of the accommodation groove of the cradle to be open from an inside of the accommodation groove toward an upper surface thereof so that sound output from the main body of the smartwatch is output to the outside through the speaker hole.

A moisture-absorbing mesh may be attached to a lower surface of the wireless charging module, may come into contact with skin of a user's wrist and may be made of a material that absorbs sweat and expands.

A band mount slot may be formed on each of both surfaces of the accommodation groove of the cradle so that a band of the smartwatch passes therethrough.

The device may further include a cooling pad which is formed on an inner surface of the accommodation groove of the cradle and pressed against an outer surface of the main body of the smartwatch to absorb heat.

The cooling pad may have an outer skin part made of a flexible material and filled with a cooling medium therein so as to be elastically pressed against the outer surface of the main body of the smartwatch.

The device may further include a window cover mounted in one side of the cradle to be vertically rotatable about a hinge shaft, made of a transparent material, and configured to cover an upper portion of the main body of the smartwatch accommodated in the accommodation groove.

A shielding part may be attached along an edge of the window cover and shield electromagnetic waves.

A light-transmitting shielding film may be attached to an upper surface or a lower surface of the window cover and shield a magnetic field.

The light-transmitting shielding film may have a structure in which magnetic field shielding layers, in which conductive metal wires are arranged in a lattice, are stacked between a transparent protective layer and an adhesive layer form and shield a magnetic field.

A cooling pack may be formed on a bottom surface of the cradle or a bottom surface of the wireless charging module to be attachable and detachable, have an outer skin part made of an electromagnetic wave shielding material, filled with a cooling fluid therein, and pressed against a user's wrist so as to absorb heat.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

Figure 1:
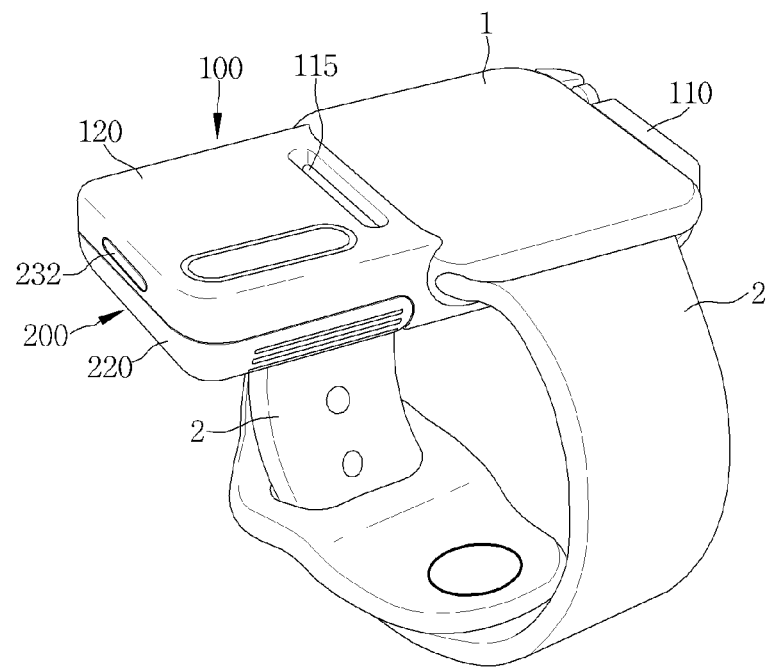
FIG. 1 is a perspective view illustrating a state in which a smartwatch is mounted in a wearable charging device for a smartwatch according to one embodiment of the present invention.
Figure 2:
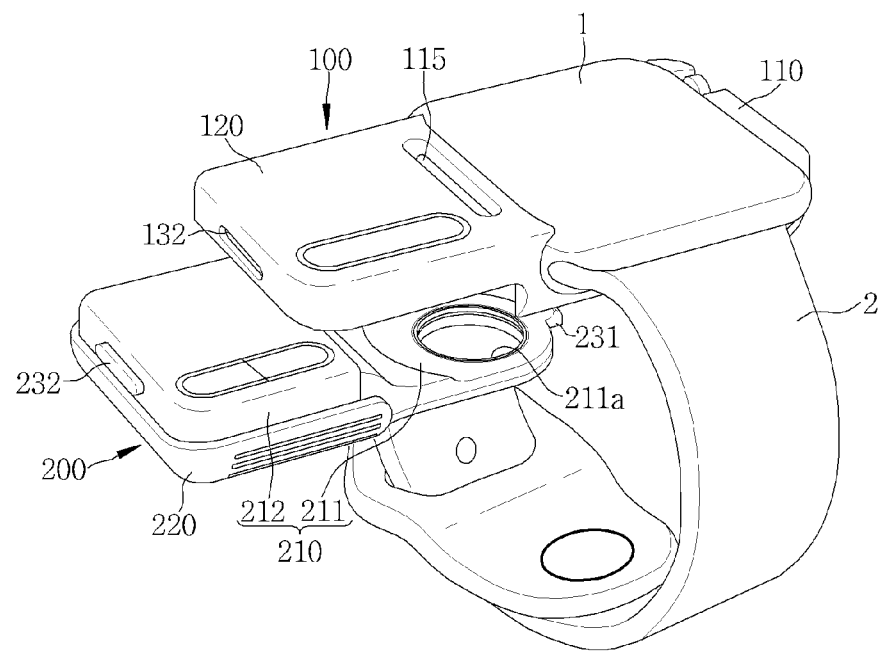
FIG. 2 is perspective view illustrating a state in which a wireless charging module is separated from the wearable charging device for a smartwatch shown in FIG. 1.
Figure 3:
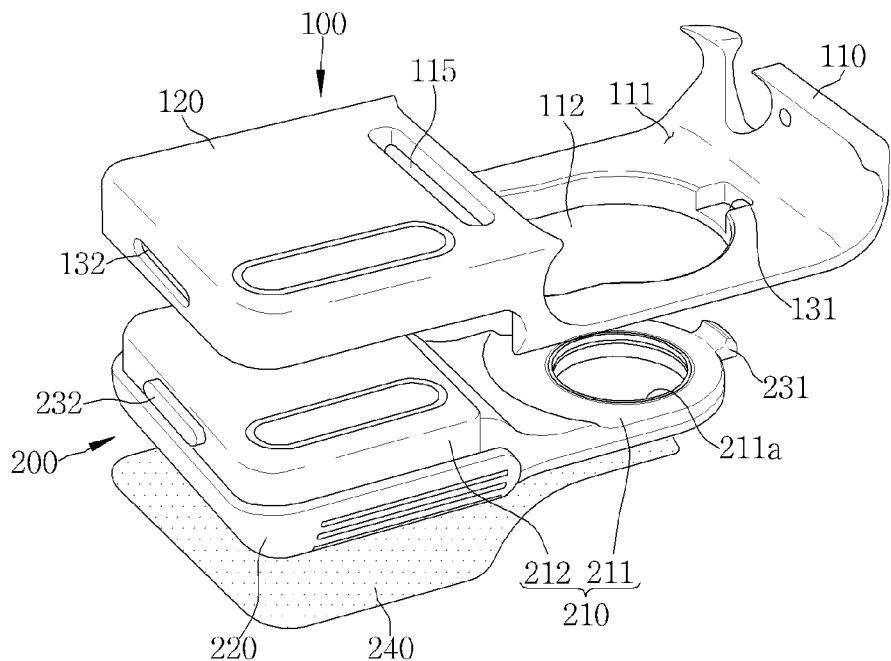
FIG. 3 is an exploded perspective view of the wearable charging device for a smartwatch shown in FIG. 1.
Figure 4:
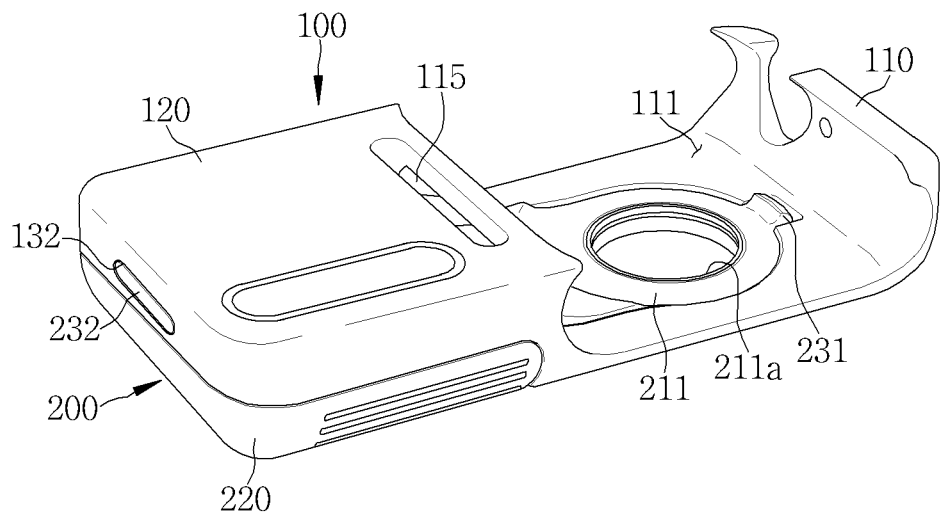
FIG. 4 is a perspective view of the wearable charging device for a smartwatch shown in FIG. 3.
Figure 5:
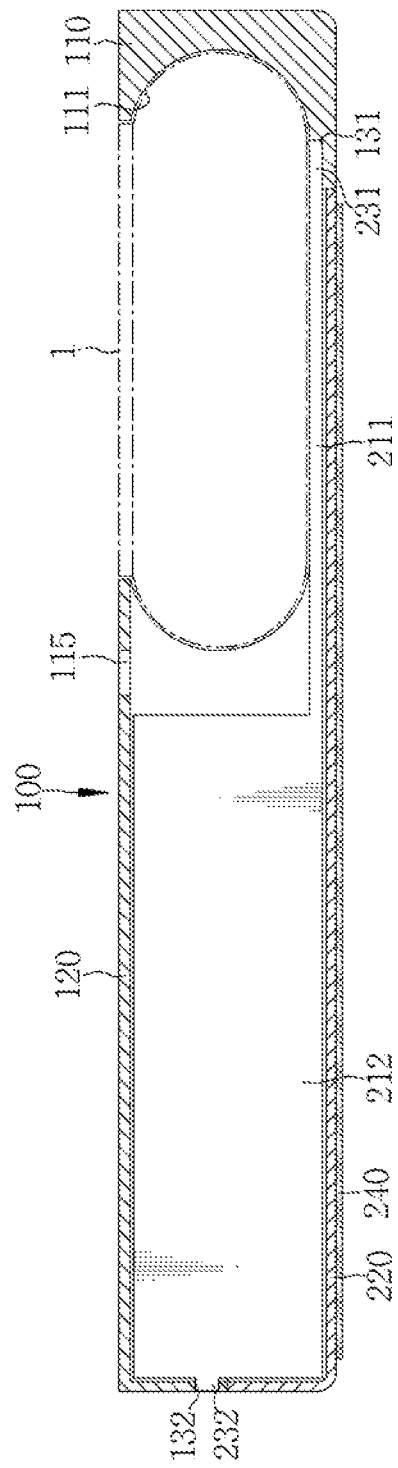
FIG. 5 is a cross-sectional view of the wearable charging device for a smartwatch shown in FIG. 3.
Figure 6:
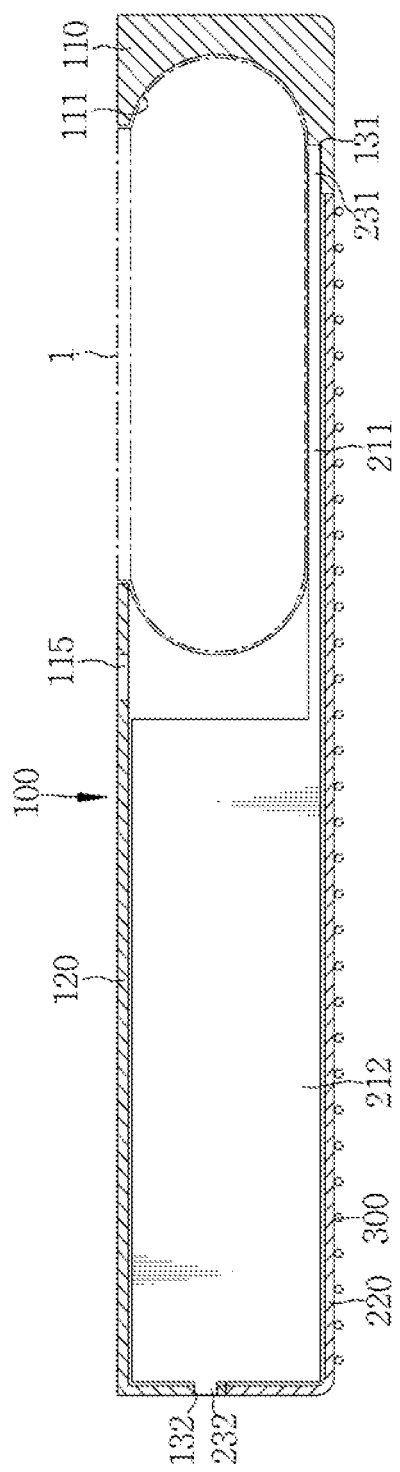
FIG. 6 is a cross-sectional view of a wearable charging device for a smartwatch according to another embodiment of the present invention.
Figure 7:
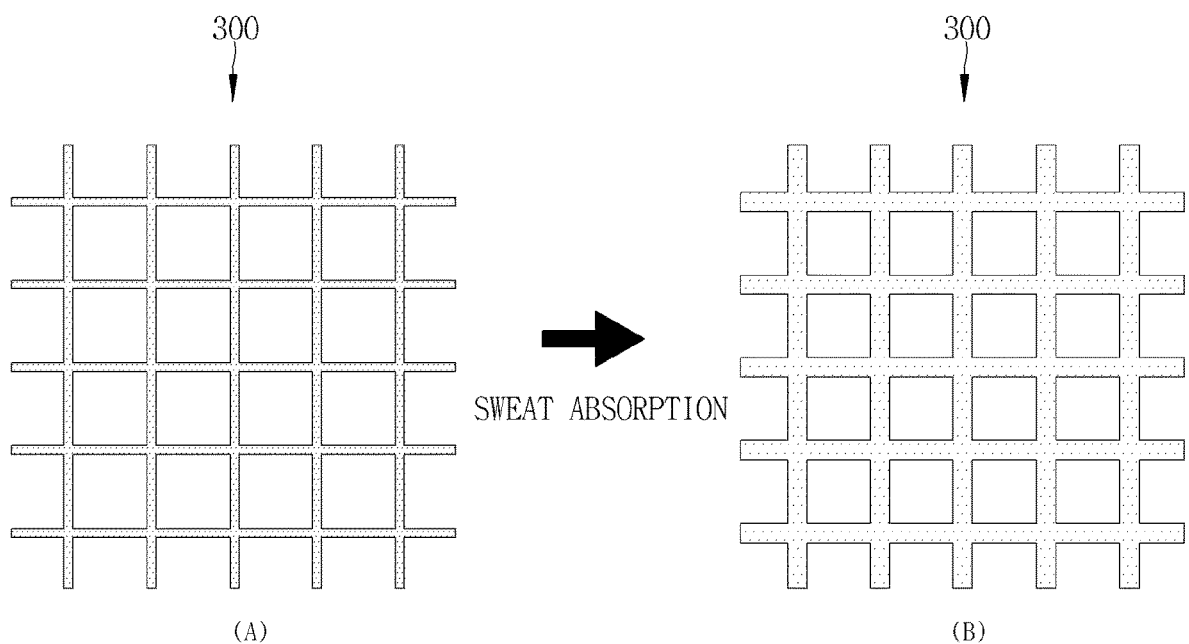

(A) and (B) of FIG. 7 are plan views illustrating a moisture-absorbing mesh applied to the wearable charging device shown in FIG. 6, wherein (A) of FIG. 7 illustrates a state before the moisture-absorbing mesh absorbs sweat, and (B) of FIG. 7 illustrates a state in which the moisture-absorbing mesh absorbs sweat and expands.

Figure 8:
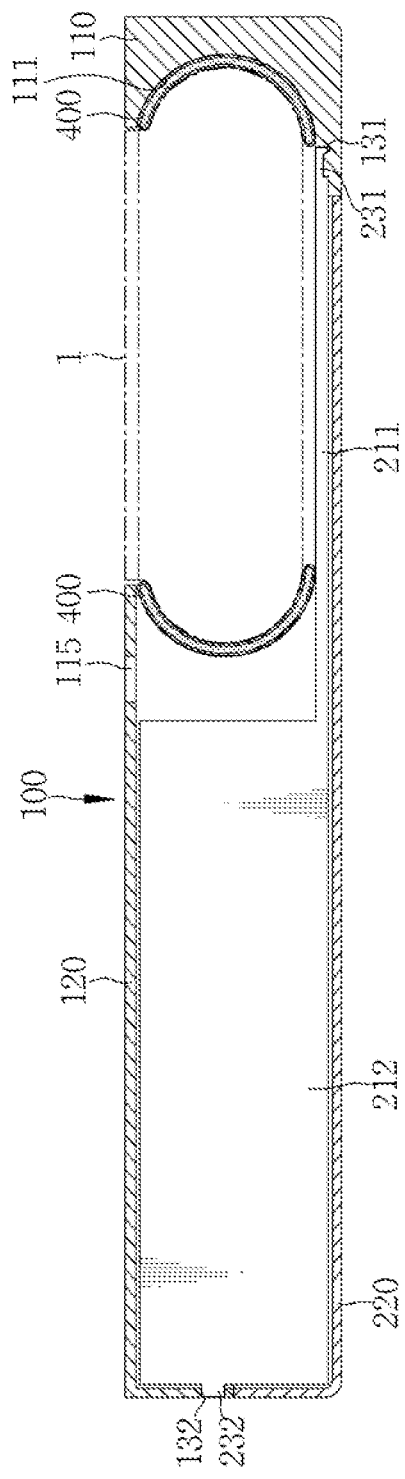
Figure 9:
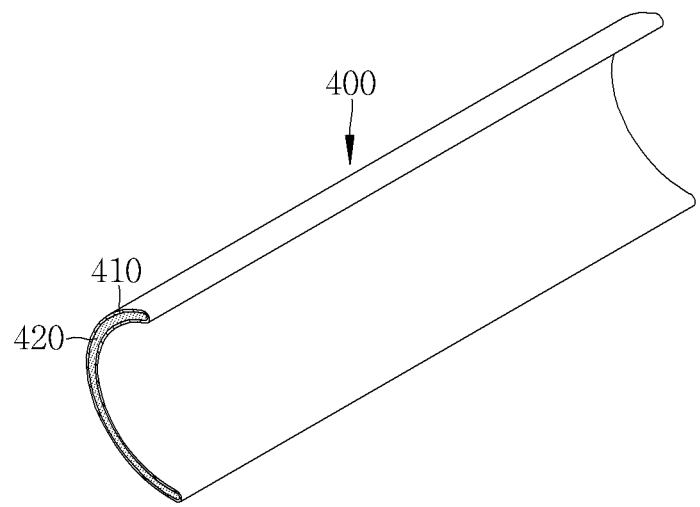
Figure 10:
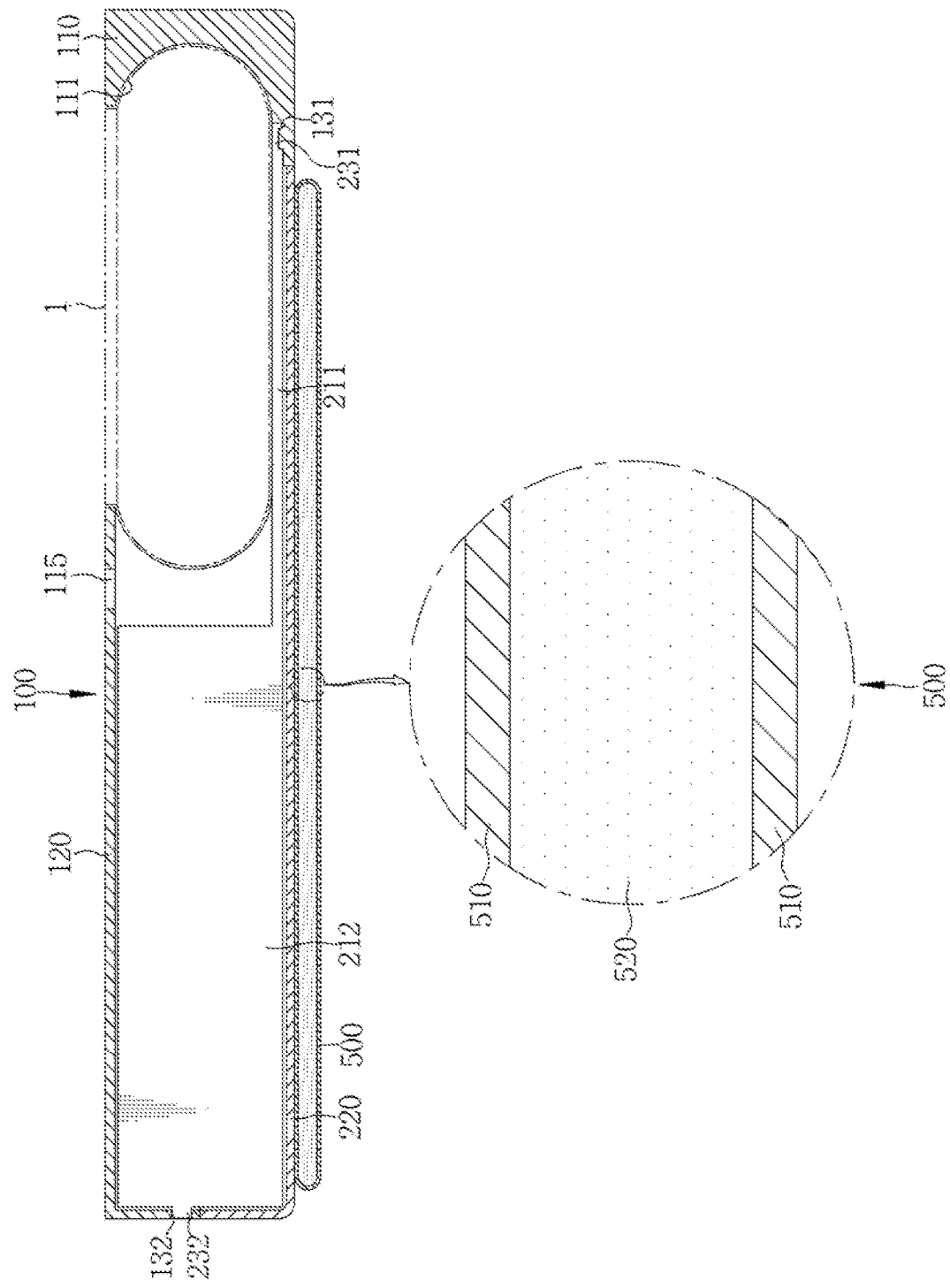
Figure 11:
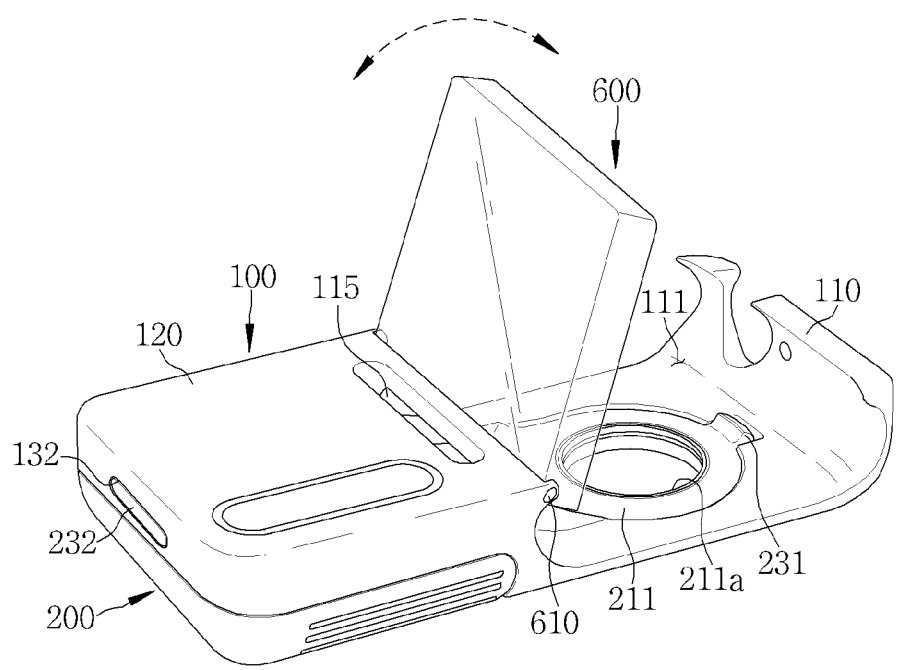
Figure 12:
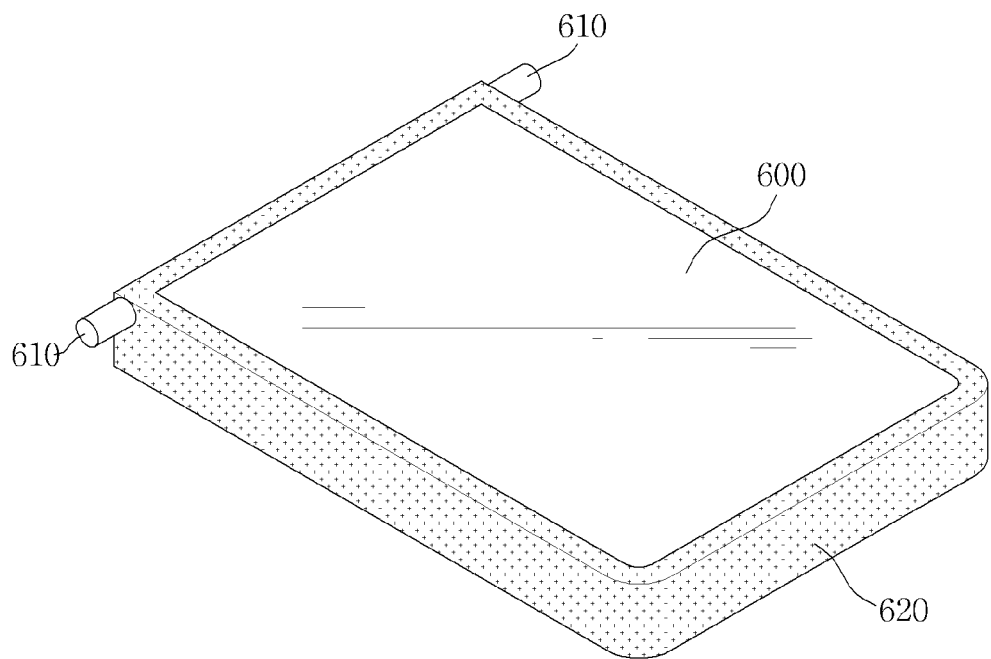
Figure 13:
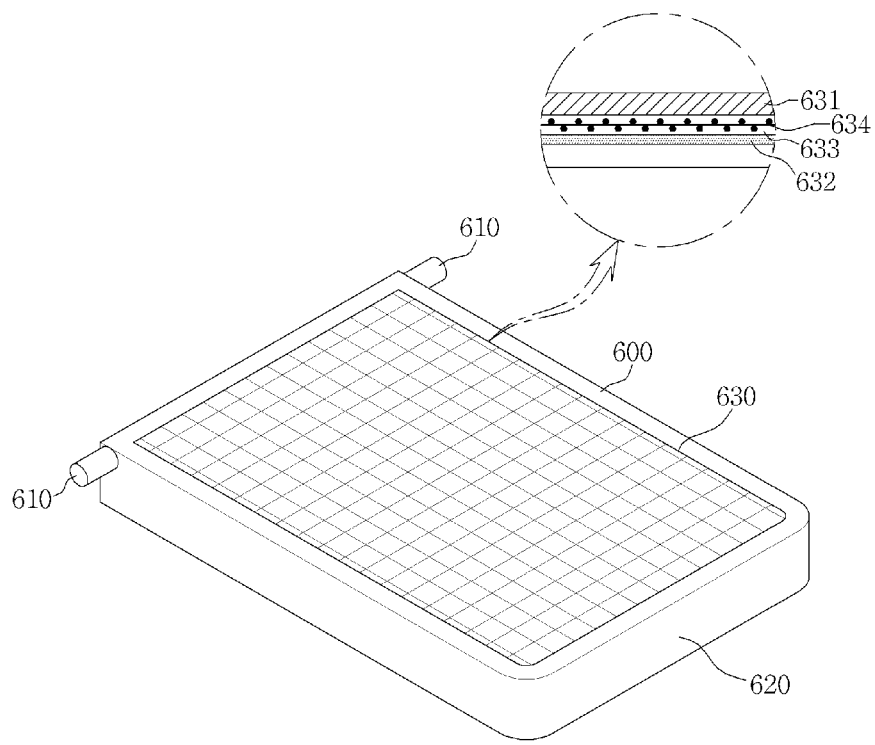
Figure 14:
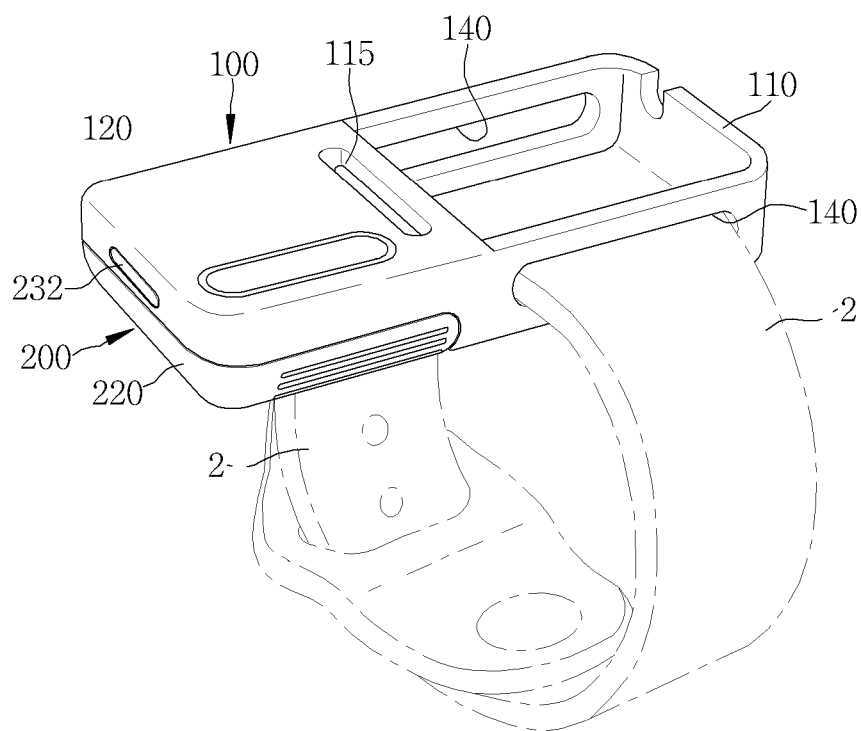

FIG. 8 is a cross-sectional view of a wearable charging device for a smartwatch according to still another embodiment of the present invention;

FIG. 9 is a perspective view illustrating a cut-out portion of a cooling pad applied to the wearable charging device shown in FIG. 8;

FIG. 10 is a cross-sectional view of a wearable charging device for a smartwatch according to yet another embodiment of the present invention;

FIG. 11 is a perspective view of a wearable charging device for a smartwatch according to yet another embodiment of the present invention;

FIG. 12 is a perspective view illustrating a modified example of a window cover applied to the wearable charging device shown in FIG. 11;

FIG. 13 is a perspective view illustrating another modified example of the window cover applied to the wearable charging device shown in FIG. 11; and FIG. 14 is a perspective view of a wearable charging device for a smartwatch according to yet another embodiment of the present invention.

DETAILED DESCRIPTION

Embodiments described in this specification and configurations illustrated in drawings are only exemplary examples of the present invention, and there may be various modifications that may substitute for the embodiments and the drawings in the specification at the time of this application's filing.

Hereinafter, a wearable charging device for a smartwatch will be described in detail with reference to the following embodiments with reference to the accompanying drawings. The same symbols in the drawings are designated with the same elements.

Referring to FIGS. 1 to 5, a wearable charging device for a smartwatch according to one embodiment of the present invention includes a cradle 100 including an accommodation groove 111 in which a main body 1 of a smartwatch is accommodated, and a wireless charging module 200 which is attached to and detached from the cradle 100 by an attachment-detachment unit and generates a magnetic field so as to charge a battery embedded in the main body 1 of the smartwatch.

The main body 1 of the smartwatch may include a display element that outputs numbers, letters, images, and the like, a communication module that performs wireless communications, a speaker that outputs sound, an image sensor, a sensor that obtains body condition information, a printed circuit board in which an electric component, such as a micro controller (Micom) for processing data, is installed, a battery that supplies power, a second coil that wirelessly charges the battery, and the like. Further, two bands 2 are formed of a flexible material that is wound around a user's wrist and are connected to both end portions of the main body 1 of the smartwatch.

The cradle 100 includes a watch holder 110 having the accommodation groove 111 recessed downward and a module holder 120 which is formed on one portion of the watch holder 110 to extend in a lateral direction and accommodates a part of the wireless charging module 200.

A hole for accommodating a power button, a volume button, or the like that is formed on the main body 1 of the smartwatch may be formed in one end portion of the watch holder 110. An opening 112 that is open downward is formed in a lower surface of the accommodation groove 111 of the watch holder 110, and a coupling groove 131 is formed in one end portion of an edge portion of the opening 112 and allows the wireless charging module 200 to be attached or detached.

The module holder 120 has a box shape that is open downward, and a long coupling hole 132 is formed in one end portion of the module holder 120 to pass through the module holder 120 and allows the wireless charging module 200 to be attached or detached.

A speaker hole 115 is formed in a portion at which an upper surface of the module holder 120 is connected with an edge portion of the accommodation groove 111, and is open from an inside of the accommodation groove 111 toward an outside of the upper surface thereof, and thus sound output from the main body 1 of the smartwatch may be output to the outside through the speaker hole 115.

The wireless charging module 200 includes a charging part 210 that generates an electromagnetic field and a cover 220 that is mounted to cover a lower portion of the charging part 210 and shields the charging part 210 when the charging part 210 is coupled to a lower portion of the cradle 100.

The charging part 210 includes a coil mount unit 211 which is disposed in a lower portion of the accommodation groove 111 of the watch holder 110 and generates an electromagnetic field, and a power supply unit 212 which is accommodated in the module holder 120 and in which a battery cell (not shown) that applies a current to a first coil and a printed circuit board (PCB) that controls the current to be supplied from the battery cell to the first coil are embedded, and the first coil, the battery cell, and the PCB are covered by a flexible and elastic cover to compose the charging part 210.

The battery cell of the power supply unit 212 may be charged in a wireless or wired manner. To this end, the power supply unit 212 may include a second coil installed therein to allow the battery cell to be charged by another wireless charger or a power terminal for connection with another wired charger.

An opening 211a is formed to be open in a circular shape in the coil mount unit 211 of the charging part 210. The first coil is installed around the opening 211a. Since the opening 211a is formed to be open in the coil mount unit 211, a body information sensor (for example, a sensor for detecting heart rate) of the main body 1 of the smartwatch mounted in the accommodation groove 111 of the cradle 100 comes into contact with a user's wrist to obtain body information.

A front end-coupling protrusion 231 is formed on one end portion of the coil mount unit 211 of the charging part 210 and is inserted into the coupling groove 131 and caught therein, wherein the coupling groove 131 is formed in one end portion of an edge portion of the opening 112 of the accommodation groove 111. A rear end-coupling protrusion 232 is formed on one end portion of the power supply unit 212 of the charging part 210 to protrude outward, is inserted into the coupling hole 132 of the cradle 100 to be coupled thereto, and is pressed by pressure applied from the outside so as to escape from the coupling hole 132.

Therefore, when the front end-coupling protrusion 231 of the charging part 210 is pushed into the coupling groove 131 and caught therein and the power supply unit 212 of the charging part 210 is pushed into the module holder 120 of the cradle 100, the rear end-coupling protrusion 232 is elastically inserted into the coupling hole 132 to be caught and coupled thereto, and the charging part 210 is firmly coupled to the cradle 100. Further, when the charging part 210 is separated from the cradle 100, the rear end-coupling protrusion 232 is pushed by a fingernail or a device to escape from the coupling hole 132, the power supply unit 212 of the charging part 210 is pulled downward from the module holder 120, the charging part 210 rotates downward about the front end-coupling protrusion 231 of the charging part 210, and the front end-coupling protrusion 231 is also separated from the coupling groove 131. A front end portion of the front end-coupling protrusion 231 has a hook shape.

The cover 220 is coupled to a lower portion of the charging part 210. In this embodiment, the cover 220 is fixed to the charging part 210 by an adhesive or integrally fixed in an insert injection molding method, but the cover 220 may be configured to be separable from the charging part 210.

Further, in the above-described embodiment, the front end-coupling protrusion 231 and the rear end-coupling protrusion 232, which are an attachment-detachment unit that attaches or detaches the wireless charging module 200 to or from the cradle 100, are formed on both sides of the charging part 210 to protrude, but, otherwise, the front end-coupling protrusion 231 and the rear end-coupling protrusion 232 that are the attachment-detachment unit may be formed even in the cover 220.

The cover 220 may be made of the same material as the cradle 100. The cover 220 may be made of a material that shields a magnetic field or may further include a magnetic field shielding sheet 240 attached to an outer surface or an inner surface thereof to shield a magnetic field like ferrite or aluminum so as to improve wireless charging efficiency.

The wearable charging device configured as described above may be operated as follows.

The front end-coupling protrusion 231 of the wireless charging module 200 is inserted into the coupling groove 131 of the accommodation groove 111 from the bottom of the cradle 100 and is coupled thereto, and the wireless charging module 200 is moved upward so that the rear end-coupling protrusion 232 is inserted into the coupling hole 132 formed in one end portion of the cradle 100, and thus the wireless charging module 200 is fixed to the cradle 100.

A user inserts the main body 1 of the smartwatch into the accommodation groove 111 of the cradle 100, sets the cradle 100 on a user's wrist, and fastens the bands 2 of the smartwatch to each other, and thus the cradle 100 is worn on the user's wrist.

In this case, when a current is applied to the first coil embedded in the coil mount unit 211 of the charging part 210 of the wireless charging module 200, an electromagnetic field is formed between the first coil and the second coil of the main body 1 of the smartwatch, and thus the battery is charged in an electromagnetic induction method. Therefore, the user can use the battery which is wirelessly charged while wearing the smartwatch on the user's wrist.

As described above, since the wireless charging module 200 including the charging part 210 and the cover 220 is formed on a lower portion of the cradle 100 to be easily attachable and detachable, when a battery embedded in the main body 1 of the smartwatch runs out, the user separates the wireless charging module 200 from the cradle 100 to replace the wireless charging module 200 with a charged wireless charging module 200 when carrying the charged wireless charging module 200 around. Therefore, the smartwatch can be used safely without worrying that the smartwatch is turned off even outdoors.

Meanwhile, the main body 1 of the smartwatch is mounted in the cradle 100 of the wearable charging device, and the smartwatch is worn on the user's wrist. When the user sweats wearing the smartwatch, the sweat remains between the wrist and the cradle 100 such as to cause an unpleasant feeling, or in severe cases, a skin problem.

As shown in FIGS. 6 and 7, a moisture-absorbing mesh 300 may be attached to a lower surface of the cover 220 of the wireless charging module 200, wherein the moisture-absorbing mesh 300 is made of a material that absorbs sweat such as to expand when touching skin of the user's wrist. The moisture-absorbing mesh 300 has a mesh structure in which fibers that expand when absorbing moisture are arranged in a lattice form, absorb sweat and expand to form an airy space between the cover 220 and user's skin so as to prevent being sweaty. The moisture-absorbing mesh 300 may be made as a disposable mesh that is simply attached to or detached from the lower surface of the cover 220.

Further, as shown in FIGS. 8 and 9, a cooling pad 400 that absorbs heat while being pressed against an outer surface of the main body 1 of the smartwatch may be formed on an inner surface of the accommodation groove 111 of the cradle 100. Since an outer skin part 410 made of a flexible material is filled with a cooling medium 420, the cooling pad 400 is elastically pressed against the outer surface of the main body 1 of the smartwatch inserted into the accommodation groove 111 to simultaneously absorb and cool heat and functions as a cushion that absorbs shock applied from the outside to prevent the main body 1 from being separated from the accommodation groove 111 or damaged. The cooling pad 400 may be formed in a curved bar shape corresponding to curved surfaces on both sides of the accommodation groove 111.

The cooling medium accommodated in the cooling pad 400 may use a known cooling medium with excellent heat absorption performance.

Further, as shown in FIG. 10, a cooling pack 500 that is pressed against a user's wrist to absorb heat may be formed on a bottom surface of the cradle 100 and/or a bottom surface of the cover 220 of the wireless charging module 200 to be attachable or detachable. The cooling pack 500 absorbs heat generated in a wireless charging process or heat generated during the activity of a user. The cooling pack 500 has a structure in which an outer skin part 510 made of an electromagnetic shielding material is filled with a cooling fluid 520 so as to softly touch a body of a user, provide a comfortable and pleasant texture and shield a magnetic field so as to minimize an effect of the magnetic field on the human body and improve wireless charging performance. The cooling pack 500 may be simply attached to and detached from the cradle 100 or the cover 220 by an element such as double-sided tape or an elastic band.

FIGS. 11 to 13 illustrate a wearable charging device according to other embodiments of the present invention, and the wearable charging device includes a transparent window cover 600 which is made of a transparent material, is formed on one portion of an accommodation groove 111 of a cradle 100 to be vertically rotatable about a hinge shaft 610, and covers an upper portion of a main body 1 of a smartwatch. The window cover 600 covers a display element, which is mounted on an upper portion of the main body 1 of the smartwatch inserted and mounted in the accommodation groove 111, to protect the display element from an external object.

The window cover 600 may be made of tempered glass or a plastic material. Further, a shielding part 620 that shields electromagnetic waves may be attached along an edge of the window cover 600. The shielding part 620 has a function that shields electromagnetic waves and covers an edge of the upper surface of the main body 1 of the smartwatch to provide a bezel effect so as to improve an aesthetic of the present invention.

Further, as shown in FIG. 13, a light-transmitting shielding film 630 that shields a magnetic field may be attached to a lower surface or an upper surface of the window cover 600. The light-transmitting shielding film 630 is made of a transparent film through which light passes so as to easily show an image, which is output from the display element of the main body 1 of the smartwatch, even through the window cover 600, and shields a magnetic field so as to improve wireless charging performance.

To this end, the light-transmitting shielding film 630 has a structure in which shielding layers 633 are stacked between a transparent protective layer 631 and an adhesive layer 632, wherein each of the shielding layers 633 has wires 634 made of a very thin conductive metal, such as a copper, and arranged in a lattice form.

FIG. 14 illustrates a wearable charging device according to still another embodiment of the present invention, and the wearable charging device includes band mount slots 140 through which two bands 2 pass and which are formed in both surfaces of an accommodation groove 111 to pass through the accommodation groove 111 of a cradle 100. The band mount slots 140 support the bands 2 of the smartwatch to allow the cradle 100 to be coupled with the smartwatch without separation from the smartwatch.

According to the present invention, a battery of a smartwatch can be charged in a wireless charging method (an electromagnetic induction method, a magnetic resonance method, or the like) while a cradle is worn on a user's wrist.

Particularly, since a wireless charging module is easily attached to or detached from a cradle in which a smartwatch is mounted, a user easily replaces the wireless charging module regardless of place, and thus the wearable charging device for a smartwatch allows a battery of the smartwatch to be charged.

The present invention has been described in detail with reference to the embodiments. It should be understood by those of skilled in the art that various replacements, additions, and modifications may be made without departing from the above-described technological scope of the present invention, and the modified embodiments are also included in the scope of the present invention defined by the appended claims.

1: MAIN BODY
2: BAND
100: CRADLE
110: WATCH HOLDER
111: ACCOMMODATION GROOVE
112: OPENING
115: SPEAKER HOLE
120: MODULE HOLDER
131: COUPLING GROOVE
132: COUPLING HOLE
140: BAND MOUNT SLOT
200: WIRELESS CHARGING MODULE
210: CHARGING PART
211: COIL MOUNT UNIT
212: POWER SUPPLY UNIT
220: COVER
231: FRONT END-COUPLING PROTRUSION
232: REAR END-COUPLING PROTRUSION
240: MAGNETIC FIELD SHIELDING SHEET
300: MOISTURE-ABSORBING MESH
400: COOLING PAD
410: OUTER SKIN PART
420: COOLING MEDIUM
500: COOLING PACK
510: OUTER SKIN PART
520: COOLING FLUID
600: WINDOW COVER
610: HINGE SHAFT
620: SHIELDING PART
630: LIGHT-TRANSMITTING SHIELDING FILM

What is claimed is:
1. A wearable charging device for a smartwatch, comprising:

a cradle including an accommodation groove in which a main body of a smartwatch is accommodated; and a wireless charging module mounted in the cradle to be attached to or detached from the cradle by an attachment-detachment unit and configured to generate an electromagnetic field to charge a battery embedded in the main body of the smartwatch, wherein the cradle includes a watch holder formed so that the accommodation groove is open downward and a module holder formed on one portion of the watch holder to extend in a lateral direction, wherein the wireless charging module includes a charging part, which includes a coil mount unit and a power supply unit, and a cover configured to cover a lower portion of the charging part to shield the charging part, wherein the coil mount unit is disposed on a lower portion of the accommodation groove of the watch holder and around which a first coil for generating an electromagnetic field is wound, and wherein the power supply unit includes a battery cell and a printed circuit board embedded therein, wherein the battery cell is accommodated in the module holder and applies a current to the first coil, and the printed circuit board controls the current to be supplied from the battery cell to the first coil.

2. The device of claim 1, wherein a magnetic field shielding sheet is additionally attached to an inner surface or an outer surface of the cover to shield a magnetic field.

3. The device of claim 1, wherein the attachment-detachment unit includes a coupling groove, a front end-coupling protrusion, and a rear end-coupling protrusion, wherein the coupling groove is formed in one end portion of an open edge portion on a lower portion of the accommodation groove, the front end-coupling protrusion is formed on one end portion of the wireless charging module to protrude and is inserted in the coupling groove to be caught, and the rear-end coupling protrusion is formed on the other end portion of the wireless charging module to protrude, is insertion-coupled to the coupling hole that is formed in the one end portion of the module holder unit to pass therethrough, and is pushed by pressure applied from the outside to escape from the coupling hole.

4. The device of claim 3, wherein the front end-coupling protrusion has a front end portion in an upwardly pointing hook shape, and the coupling groove has a groove shape corresponding to the front end-coupling protrusion.

5. The device of claim 1, wherein a speaker hole is formed in an edge portion of the accommodation groove of the cradle to be open from an inside of the accommodation groove toward an upper surface thereof so that sound output from the main body of the smartwatch is output to the outside through the speaker hole.

6. The device of claim 1, further comprising a moisture-absorbing mesh that is attached to a lower surface of the wireless charging module to come into contact with skin of a user's wrist and is made of a material that absorbs sweat and expands.

7. The device of claim 1, further comprising a band mount slot that is formed in each of both surfaces of the accommodation groove of the cradle so that a band of the smartwatch passes therethrough.

8. The device of claim 1, further comprising a cooling pad which is formed on an inner surface of the accommodation groove of the cradle and pressed against an outer surface of the main body of the smartwatch to absorb heat.

9. A wearable charging device for a smartwatch, comprising:

a cradle including an accommodation groove in which a main body of a smartwatch is accommodated;

a wireless charging module mounted in the cradle to be attached to or detached from the cradle by an attachment-detachment unit and configured to generate an electromagnetic field to charge a battery embedded in the main body of the smartwatch; and a cooling pad which is formed on an inner surface of the accommodation groove of the cradle and pressed against an outer surface of the main body of the smartwatch to absorb heat, wherein the cooling pad has an outer skin part made of a flexible material and filled with a cooling medium therein so as to be elastically pressed against the outer surface of the main body of the smartwatch.

10. The device of claim 1, further comprising a window cover mounted on one side of the cradle to be vertically rotatable about a hinge shaft, made of a transparent material, and configured to cover an upper portion of the main body of the smartwatch accommodated in the accommodation groove.

11. The device of claim 10, wherein a shielding part is attached along an edge of the window cover and shields electromagnetic waves.

12. The device of claim 10, further comprising a light-transmitting shielding film that is attached to an upper surface or a lower surface of the window cover and shields a magnetic field.

13. The device of claim 12, wherein the light-transmitting shielding film has a structure in which magnetic field shielding layers, in which conductive metal wires are arranged in a lattice form, are stacked between a transparent protective layer and an adhesive layer and shield a magnetic field.

14. A wearable charging device for a smartwatch, comprising:

a cradle including an accommodation groove in which a main body of a smartwatch is accommodated;

a wireless charging module mounted in the cradle to be attached to or detached from the cradle by an attachment-detachment unit and configured to generate an electromagnetic field to charge a battery embedded in the main body of the smartwatch; and a cooling pack that is formed on a bottom surface of the cradle or a bottom surface of the wireless charging module to be attachable and detachable, has an outer skin part made of an electromagnetic wave shielding material, filled with a cooling fluid therein, and pressed against a user's wrist so as to absorb heat.

* * * * *